US007906238B2

(12) United States Patent
Le

(10) Patent No.: US 7,906,238 B2
(45) Date of Patent: Mar. 15, 2011

(54) SILICON-CONTAINING ALLOYS USEFUL AS ELECTRODES FOR LITHIUM-ION BATTERIES

(75) Inventor: Dinh Ba Le, Saint Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 1230 days.

(21) Appl. No.: 11/469,561

(22) Filed: Sep. 1, 2006

(65) Prior Publication Data
US 2007/0148544 A1 Jun. 28, 2007

Related U.S. Application Data

(60) Provisional application No. 60/743,075, filed on Dec. 23, 2005.

(51) Int. Cl.
H01M 4/1395 (2010.01)
H01B 1/04 (2006.01)
(52) U.S. Cl. ............... 429/218.1; 429/231.5; 429/231.8; 429/232; 252/516; 252/521.3
(58) Field of Classification Search .................. 252/516, 252/182.1; 429/231.8, 231.95, 218.1, 231.5, 429/232
See application file for complete search history.

(56) References Cited

U.S. PATENT DOCUMENTS

| | | | |
|---|---|---|---|
| 5,504,128 A | 4/1996 | Mizutani et al. | |
| 5,536,599 A | 7/1996 | Alamgir et al. | |
| 5,587,256 A | 12/1996 | Wilson et al. | |
| 5,709,968 A | 1/1998 | Shimizu | |
| 5,763,119 A | 6/1998 | Adachi | |
| 5,858,573 A | 1/1999 | Abraham et al. | |
| 5,882,812 A | 3/1999 | Visco et al. | |
| 5,900,385 A | 5/1999 | Dahn et al. | |
| 6,004,698 A | 12/1999 | Richardson et al. | |
| 6,045,952 A | 4/2000 | Kerr et al. | |
| 6,090,505 A | 7/2000 | Shimamura et al. | |
| 6,203,944 B1 | 3/2001 | Turner et al. | |
| 6,235,427 B1 | 5/2001 | Idota et al. | |
| 6,387,571 B1 | 5/2002 | Lain et al. | |
| 6,432,585 B1 | 8/2002 | Kawakami et al. | |
| 6,436,578 B2 | 8/2002 | Turner et al. | |
| 6,495,291 B1 | 12/2002 | Kohno et al. | |
| 6,506,520 B1 | 1/2003 | Inoue et al. | |
| 6,528,208 B1 | 3/2003 | Thackeray et al. | |
| 6,548,208 B1 | 4/2003 | Kasamatsu et al. | |
| 6,551,744 B1 | 4/2003 | Ohzuku et al. | |
| 6,599,663 B2 | 7/2003 | Hashimoto et al. | |
| 6,680,145 B2 | 1/2004 | Obrovac et al. | |
| 6,699,336 B2 | 3/2004 | Turner et al. | |
| 6,730,434 B1 | 5/2004 | Kawakami et al. | |
| 6,806,003 B1 | 10/2004 | Yamaguchi et al. | |
| 6,964,828 B2 | 11/2005 | Lu et al. | |
| 7,078,128 B2 | 7/2006 | Lu et al. | |
| 7,498,100 B2 | 3/2009 | Christensen et al. | |
| 2002/0031708 A1 | 3/2002 | Krause et al. | |
| 2002/0162606 A1 | 11/2002 | Turner et al. | |
| 2003/0108793 A1 | 6/2003 | Dahn et al. | |
| 2003/0134198 A1 | 7/2003 | Sawa et al. | |
| 2004/0058240 A1 | 3/2004 | Christensen | |
| 2004/0121234 A1 | 6/2004 | Le | |
| 2004/0146734 A1* | 7/2004 | Miller et al. | 428/547 |
| 2004/0179993 A1 | 9/2004 | Dahn et al. | |
| 2004/0241548 A1 | 12/2004 | Nakamoto et al. | |
| 2005/0042128 A1* | 2/2005 | Matsubara et al. | 419/66 |
| 2005/0112054 A1 | 5/2005 | Eberman et al. | |
| 2005/0181283 A1 | 8/2005 | Pugh et al. | |
| 2005/0191556 A1 | 9/2005 | Kim et al. | |
| 2005/0208378 A1* | 9/2005 | Mizutani et al. | 429/231.95 |
| 2005/0221196 A1 | 10/2005 | Dahn et al. | |
| 2006/0068285 A1* | 3/2006 | Yamaguchi et al. | 429/218.1 |
| 2006/0068292 A1* | 3/2006 | Mizutani et al. | 429/231.8 |
| 2006/0099506 A1 | 5/2006 | Krause et al. | |
| 2006/0102472 A1* | 5/2006 | Bito et al. | 204/293 |
| 2006/0127773 A1* | 6/2006 | Kawakami et al. | 429/245 |
| 2006/0263695 A1 | 11/2006 | Dahn et al. | |
| 2006/0263697 A1 | 11/2006 | Dahn et al. | |
| 2007/0020522 A1* | 1/2007 | Obrovac et al. | 429/218.1 |
| 2009/0305131 A1* | 12/2009 | Kumar et al. | 429/206 |
| 2010/0119942 A1* | 5/2010 | Kumar | 429/220 |

FOREIGN PATENT DOCUMENTS

EP    0 883 199 A1    12/1998
(Continued)

OTHER PUBLICATIONS

Davies, "Metallic glass formation", *Amorphous Metallic Alloys*, Chapter 2, pp. 8-25, F. E. Luborsky, ed., Butterworth & Co., 1983.
Wilson et al., "Lithium Insertion in Carbons Containing Nanodispersed Silicon", *J. Electrochem. Soc.*, vol. 142, No. 2, Feb. 1995, pp. 326-332.
Yang et al., "Small particle size multiphase Li-alloy anodes for lithium-ion-batteries", *Solid State Ionics* 90 (1996) 281-287.
Besenhard et al., "Will advanced lithium-alloy anodes have a chance in lithium-ion batteries?", *Journal of Power Sources* 68 (1997) 87-90.
Dahn et al., "Economical Sputtering System to Produce Large-Size Composition-Spread Libraries Having Linear and Orthogonal Stoichiometry Variations", *Chem. Mater.*, 14, 2002, pp. 3519-3523.
Egashira et al., "Properties of containing Sn nanoparticles activated carbon fiber for a negative electrode in lithium batteries", *Journal of Power Sources* 107 (2002) 56-60.
Beaulieu et al., "The Electrochemical Reaction of Li with Amorphous Si-Sn Alloys", *J. Electrochem. Soc.*, 150 (2) A149-A156 (2003).

(Continued)

Primary Examiner — Mark Kopec
Assistant Examiner — Haidung D Nguyen
(74) Attorney, Agent, or Firm — Dean M. Harts; Stephen F. Wolf

(57) ABSTRACT

An electrode composition for a lithium ion battery having the formula $Si_xSn_qM_yC_z$ where q, x, y, and z represent atomic percent values and (a) $(q+x) > 2y+z$; (b) $q \geq 0$, (c) $z \geq 0$; and (d) M is one or more metals selected from manganese, molybdenum, niobium, tungsten, tantalum, iron, copper, titanium, vanadium, chromium, nickel, cobalt, zirconium, yttrium, or a combination thereof. The Si, Sn, M, and C elements are arranged in the form of a multi-phase microstructure comprising: (a) an amorphous phase comprising silicon; (b) a nanocrystalline phase comprising a metal silicide; and (c) a phase comprising silicon carbide phase when $z>0$; and (d) an amorphous phase comprising Sn when $q>0$.

22 Claims, No Drawings

FOREIGN PATENT DOCUMENTS

| | | |
|---|---|---|
| EP | 1 028 476 A1 | 8/2000 |
| EP | 1 039 568 A1 | 9/2000 |
| EP | 1 274 140 A1 | 1/2003 |
| JP | 61-066369 | 4/1986 |
| JP | 10-046299 | 2/1998 |
| JP | 10 294112 | 11/1998 |
| JP | 2000-113912 | 4/2000 |
| JP | 2001-015102 | 1/2001 |
| JP | 2001 250542 | 9/2001 |
| JP | 2001-256974 | 9/2001 |
| JP | 2001-297757 | 10/2001 |
| JP | 2002-075351 | 3/2002 |
| JP | 2003-346793 | 12/2003 |
| WO | WO 94/11138 | 5/1994 |
| WO | WO 99/49532 | 9/1999 |
| WO | WO 00/14817 | 3/2000 |
| WO | WO 00/33402 | 6/2000 |
| WO | WO 01/29920 A1 | 4/2001 |
| WO | WO 01/52337 A1 | 7/2001 |
| WO | WO 02/052664 A2 | 7/2002 |
| WO | WO 2004/086539 A1 | 10/2004 |
| WO | WO 2005/013397 A1 | 2/2005 |
| WO | WO 2006/028583 A2 | 3/2006 |

OTHER PUBLICATIONS

Cumyn et al., "Design and Testing of a Low-Cost Multichannel Pseudopotentiostat for Quantitative Combinatorial Electrochemical Measurements on Large Electrode Arrays", *Electrochemical and Solid-State Letters,* 6 (6) E15-E18 (2003).

Fleischauer et al., "Design and Testing of a 64-Channel Combinatorial Electrochemical Cell", *J. Electrochem. Soc.,* 150 (11) A1465-A1469 (2003).

Sakaguchi et al., "Ce-Sn intermetallic compounds as new anode materials for rechargeable lithium batteries", *Journal of Power Sources* 119-121 (2003) 50-55.

Tirado, "Inorganic materials for the negative electrode of lithium-ion batteries: state-of-the-art and future prospects", *Materials Science and Engineering R* 40 (2003) 103-136.

Obrovac et al., "Structural Changes in Silicon Anodes during Lithium Insertion/Extraction", *Electrochemical and Solid-State Letter,* 7 (5) A93-A96 (2004).

Dahn et al., "The Impact of the Addition of Rare Earth Elements to $Si_{1-x}Sn_x$ Negative Electrode Materials for Li-Ion Batteries", *J. Electrochem. Soc.,* 153 (6) A1211-A1220 (2006).

Dahn et al., "Rechargeable Lithium-ion Cell with Triphenylamine Redox Shuttle", U.S. Appl. No. 60/743,314, filed Feb. 17, 2006.

* cited by examiner

SILICON-CONTAINING ALLOYS USEFUL AS ELECTRODES FOR LITHIUM-ION BATTERIES

CROSS REFERENCE TO RELATED APPLICATION

This application claims priority to U.S. Application No. 60/743,075, filed Dec. 23, 2005, the disclosure of which is incorporated by reference in its entirety herein.

TECHNICAL FIELD

This invention relates to electrode compositions useful in lithium-ion batteries, methods of making such compositions, and batteries including such compositions.

BACKGROUND

Metal alloys have been proposed as anodes for lithium ion batteries. These alloy-type anodes generally exhibit higher capacities relative to intercalation-type anodes such as graphite. One problem with such alloys, however, is that they often exhibit relatively poor cycle life and poor coulombic efficiency due to fragmentation of the alloy particles during the expansion and contraction associated with compositional changes in the alloys.

SUMMARY

There is described an electrode composition for a lithium ion battery having the formula $Si_xSn_qM_yC_z$ where q, x, y, and z represent atomic percent values and (a) $(q+x)>2y+z$; (b) $x>0$, (c) each of q and z, independently, is $\geq 0$; and (d) M is one or more metals selected from the group consisting of manganese, molybdenum, niobium, tungsten, tantalum, iron, copper, titanium, vanadium, chromium, nickel, cobalt, zirconium, yttrium, and combinations thereof. The Si, Sn, M, and C elements are arranged in the form of a multi-phase microstructure comprising: (a) an amorphous phase comprising silicon; (b) a nanocrystalline phase comprising a metal silicide; and (c) a phase comprising silicon carbide when $z>0$; and (d) an amorphous phase comprising Sn when $q>0$.

An "amorphous phase" is a phase that lacks long range atomic order and whose x-ray diffraction pattern lacks sharp, well-defined peaks.

A "nanocrystalline phase" is a phase having crystallites no greater than about 50 nanometers that exhibits long range atomic order and has an x-ray diffraction pattern characterized by sharp, well-defined peaks.

In some embodiments, the value of x may be chosen such that $x \geq 60$ and the value of z may be chosen such that $z>0$, $z \geq 10$, or $z \geq 15$. For example, in one embodiment, $x \geq 60$, $\geq 70$, or even higher, $z>0$ or $\geq 10$, and M is one or more metals selected from the group consisting of cobalt, nickel, iron, titanium, molybdenum, and combinations thereof. In another embodiment, M includes Co, $x \geq 60$, and $z>0$.

The electrode composition may be used as the anode for a lithium-ion battery that also includes a cathode and an electrolyte. The electrolyte may include any known electrolyte, e.g., fluoroethylene carbonate. Preferably, the anode is in the form of a composite that includes the electrode composition in combination with a binder (any known binder, e.g., a polyimide) and a conductive diluent (any known conductive diluent, e.g., carbon black).

The electrodes, when incorporated in lithium-ion batteries, exhibit good cycle life and coulombic efficiency.

The details of one or more embodiments of the invention are set forth in the accompanying drawings and the description below. Other features, objects, and advantages of the invention will be apparent from the detailed description and from the claims.

DETAILED DESCRIPTION

All numbers are herein assumed to be modified by the term "about." The recitation of numerical ranges by endpoints includes all numbers subsumed within that range (e.g., 1 to 5 includes 1, 1.5, 2, 2.75, 3, 3.80, 4, and 5).

Electrode compositions are described that are particularly useful as anodes for lithium-ion batteries. The electrode compositions feature an electrode composition for a lithium ion battery having the formula $Si_xSn_qM_yC_z$ where q, x, y, and z represent atomic percent values and (a) $(q+x)>2y+z$; (b) $q \geq 0$, (c) $z \geq 0$; and (d) M is one or more metals selected from the group consisting of manganese, molybdenum, niobium, tungsten, tantalum, iron, copper, titanium, vanadium, chromium, nickel, cobalt, zirconium, yttrium, and combinations thereof. The Si, Sn, M, and C elements are arranged in the form of a multi-phase microstructure comprising: (a) an amorphous phase comprising silicon (thus, $x>0$); (b) a nanocrystalline phase comprising a metal silicide; and (c) a phase comprising silicon carbide when $z>0$; and (d) an amorphous phase comprising Sn when $q>0$. Preferably, the electrode compositions are prepared by ball-milling silicon, the metal(s), and, in embodiments were carbon is used, a carbon source (e.g., graphite), under high shear and high impact for an appropriate period of time. Ball-mills such as a vertical ball mill (ATTRITOR, Union Process Inc., Akron, Ohio), a SPEXMILL (Spex CertiPrep, Metuchen, N.J.), a horizontal rotary ball mill (SIMOLOYER, Zoz GmbH, Werden, Germany) or other ball mills known in the art also may be used.

The electrode compositions are particularly useful as anodes for lithium-ion batteries. The anode preferably is a composite in which the electrode composition is combined with a binder and a conductive diluent. Examples of suitable binders include polyimides and polyvinylidene fluoride. Examples of suitable conductive diluents include carbon blacks.

To prepare a battery, the anode is combined with an electrolyte and a cathode (the counter electrode). The electrolyte may be in the form of a liquid, solid, or gel. Examples of solid electrolytes include polymeric electrolytes such as polyethylene oxide, fluorine-containing polymers and copolymers (e.g., polytetrafluoroethylene), and combinations thereof. Examples of liquid electrolytes include ethylene carbonate, diethyl carbonate, propylene carbonate, fluoroethylene carbonate (FEC), and combinations thereof. The electrolyte is provided with a lithium electrolyte salt. Examples of suitable salts include $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, and $LiClO_4$. Examples of suitable cathode compositions include $LiCoO_2$, $LiCo_{0.2}Ni_{0.8}O_2$, and $LiMn_2O_4$. Additional examples include the cathode compositions described in the following documents, each of which is incorporated by reference in its entirety: (1) Lu et al., U.S. Pat. No. 6,964,828; (2) Lu et al., U.S. Pat. No. 7,078,128; (3) Le, U.S. Publ. Pat. Appln. No. 2004/0121234; (4) Dahn et al., U.S. Publ. Pat. Appln. No. 2003/0108793; (5) Eberman et al., U.S. Publ. Pat. Appln. No. 2005/0112054; (6) Dahn et al., U.S. Publ. Pat. Appln. No. 2004/0179993; (7) Obrovac et al., U.S. Pat. No. 6,680,145; and (8) Dahn et al., U.S. Pat. No. 5,900,385.

EXAMPLES

Silicon, iron, nickel, titanium, cobalt and tin were obtained from either Alfa Aesar of Ward Hill, Mass., Aldrich Chemical Company of Milwaukee, Wis. or Alcan Metal Powders of Berkeley, CA.

X-ray diffraction patterns were collected using a Siemens Model Kristalloflex 805 D500 diffractometer equipped with a copper target x-ray tube and a diffracted beam monochromator. The data presented in the column labeled "Observed Phases from X-ray data" of Table 1A and Table 1B are based on the presence or absence of characteristic patterns of peaks obtained for each of the alloy samples listed. For example, a phase was considered to be amorphous when the X-ray diffraction pattern was absent or lacked sharp, well-defined peaks. The grain sizes of the crystalline phases were determined by the Scherer equation. When the grain size was calculated to be less than 50 nanometers, the phase was considered to be nanocrystalline.

Samples 1-14 listed in Table 1A were prepared by milling the recorded amounts of silicon chips (Alfa Aesar, catalog no. 00311), metal(s), and graphite powder (MCMB-1028, MMM Carob, Belgium) with 28 tungsten carbide balls (5/16-inches each, approximately 108 grams) for 4 hours in a 45 milliliter tungsten carbide vessel using a SPEX MILL (Model 8000-D, Spex CertiPrep, Metuchen, N.J.) under an argon atmosphere. The vessel was then opened, chunks of caked powder were broken up, and the milling was continued for an additional hour in an argon atmosphere. The temperature of the tungsten carbide vessel was maintained at about 30° C. by air cooling.

Examples 15-16 listed in Table 1A were prepared by the same general procedure as Examples 1-14 with the following differences. Silicon powder (325 mesh; Alfa Aesar, catalog no. 35662), tin powder (<10 microns, Aldrich, catalog no. 520373) and metal powders (Cobalt, 1.6 microns; Alfa Aesar, catalog no. 10455C Alfa Aesar; Nickel, Alcan Metal Powder, Type 123) were used. Examples 15 and 16 were milled with 14 tungsten carbide balls (0.415 millimeter diameter; approximately 54 grams total weight) in the SPEX MILL for 16 hours in an argon atmosphere. The temperature of the tungsten carbide vessel was maintained at about 30° C. by air cooling Each of the Examples 1-16 listed in Table 1A was formed into an electrode and characterized in an electrochemical cell that had a lithium metal counter electrode. The electrodes were prepared by the following procedure. An amount of 1.8 g of the milled material, 0.06 g conductive carbon (SUPER P from MMM Carbon, Belgium) and 0.70 g PI2555 (PYRALIN PI2555, a 20 weight percent solution in N-methyl-2-pyrrolidinone from HD Microsystems, Cheesequake Road, Parlin, N.J.) were mixed in a 45-milliliter stainless steel vessel using four tungsten carbide balls (12.75 mm diameter). The mixing was done in a planetary micro mill (PULVERISETTE 7, from Fritsch GmbH, Idon-Oberstein, Germany) at a speed setting of 3 for 2 hours. The resulting solution was then coated onto a 13 micrometer thick copper foil using a notch bar coating die with a 0.0075 inch (76.2 micrometer) gap. The coating was dried in a vacuum oven at 150° C. for 2 hours, and then used to construct 2325 coin cells consisting of a 380 micrometer thick metallic lithium foil counter electrode, two layers of a flat sheet polypropylene membrane separator (CELGARD 2400, from CELGARD Inc., Charlotte, N.C.), and 1 M $LiPF_6$ in an electrolyte (mixture containing 90 parts of 1:2 volume mixture of ethylene carbonate and diethyl carbonate and 10 parts of fluoroethylene carbonate from SynQuest Laboratories of Alachua, Fla.). This mixture was dried over molecular sieves (3A type) for 12 h before use. The 2325 coin cell hardware is described in A. M. Wilson and J. R. Dahn, *J. Electrochem. Soc.*, 142, 326-332 (1995).

Electrochemical cells prepared from Examples 1-16 were cycled between 0.9 V and 5 mV using a cell tester (Maccor Inc., Tulsa Okla.). The 200 mA/gram current was allowed to relax to 10 mA/gram, at the lower voltage cutoff, before the next charge cycle. The measured charge efficiency and coulombic efficiency values were recorded in Table 2.

Example 17 was prepared by melting 65.461 grams of silicon lumps (Alfa Aesar/99.999%, catalog no. 39101), 18.596 grams of iron pieces (Alfa Aesar/99.97%, catalog no. 10454) and 15.943 grams of titanium sponge (Alfa Asear/99.7%, catalog no. 10582) in an ARC furnace. The alloy ingot ($Si_{70}Fe_{10}Ti_{10}$) was broken into small chunks and was treated in a hammer mill to produce 150-micron size powder. The $Si_{70}Fe_{10}Ti_{10}$ alloy powder (3.8462 g) and graphite (0.1528 g, SFG44/Tim Rex) were milled in the SPEX MILL together with 28 tungsten carbide balls (10.5 millimeter each, total weight 108 grams) for 1 hour in a 45-milliliter tungsten carbide vessel (Model 8001, Spex CertiPrep, Metuchen, N.J.) filled with argon. The vessel was cooled with air jet during milling. The vessel temperature was about 30° C. during milling.

Example 18 was prepared by milling 3.9409 grams of $Si_{70}Fe_{10}Ti_{10}$ alloy powder made by the procedure of Example 17 and 0.0591 grams of graphite in the SPEX MILL as in Example 17.

Example 19 was prepared by the same procedure as in Example 17, except by using 64.605 g of silicon lumps, 27.528 g of iron pieces and 7.867 g of titanium sponge to prepare the $Si_{70}Fe_{15}Ti_5$ alloy powder. Then 3.8481 g of $Si_{70}Fe_{15}Ti_5$ alloy powder and 0.1519 g of graphite were milled in the SPEX MILL as in Example 17.

Example 20 was prepared by milling 3.9417 g of $Si_{70}Fe_{15}Ti_5$ alloy powder made by the procedure of Example 19 and 0.0583 g of graphite in the PSEX MILL as in Example 17.

Each of the Examples 17-20 was formed into an electrode and characterized in an electrochemical cell that had a lithium counter electrode. The electrodes containing Examples 17-20 were prepared by the following procedure. A sample of the milled material (1.84 g), conductive carbon (0.024 g, Ketjen Black, Akzo Nobel) and NMP (2 g) were mixed in a 45-mL stainless steel vessel using four tungsten carbide balls (12.5 millimeter each) in the planetary micro mill at a speed setting of 1 for 30 minutes, then PYRALIN PI2555 (0.68 g, 20 wt % PI2555 solids in NMP) was added and mixed at a speed setting of 2 for 1 hour. The resulting solution was coated onto a 13-micron thick copper foil using a notch bar coating die set with a 125 micrometer gap. The coated sample was dried in a vacuum oven at 150° C. for 2 hours. Disks (16-mm diameter) were punched from the coating.

The coatings prepared from Examples 17-20 were tested in 2325 coins cells assembled in the same manner as for Example 1. The coins cells prepared with Examples 17-20 were cycled as for Example 1, except a current density of 250 mA/gram-alloy was used and a 15 minute period at open circuit was used at the end of each half-cycle. The measured charge efficiency and coulombic efficiency values were recorded in Table 2.

Example 21 was prepared by milling 903.602 g silicon powder (−100+325 mesh, Globe Metallurgical Inc., Beverly, Ohio), 406.307 g of cobalt (99.8% pure, 1.6 μm particles from Alfa Aesar, catalog no. 10455C), 134.885 g nickel powder (99.9% pure, 2-3 μm particles, Alfa Aesar, catalog no. 10255) and 55.206 g graphite powder (Timrex SFG44, TimCal Ltd., Bodio, Switzerland) with 25 kg of chrome steel balls (5 mm, 100Cr6 steel) in a high-impact, horizontal mill (Simoloyer, CM20-Solm, Zoz GmbH) at 550 rpm for 45 seconds and then at 300 rpm for 15 seconds in repeated cycles. Example 21 was milled for a total of three hours. Examples 22 and 23 were prepared by the same procedure as Example 21, except the milling times were 5 h and 7.5 h, respectively.

Each of the Examples 21-23 was formed into an electrode and characterized in an electrochemical cell, as in Example 17, and the cells were cycled by the same procedure as Example 17. Each of these Examples included an amorphous phase comprising silicon. The specific capacity (mAh/g) of each of these materials after 30 cycles was: Example 21, 1220; Example 22, 1050; and Example 23, 920.

TABLE 1A

Alloy powder preparations

| Example No. | Stoichiometric Formula (Atomic Percent) | Silicon Chips (grams) | Metal(s) (grams) | Carbon or Graphite (grams) | Observed phases from X-ray data |
|---|---|---|---|---|---|
| 1 | $Si_{66}Co_{22}C_{12}$ | 2.813 | Co, 1.968 | 0.219 | Amorphous Si<br>Amorphous SiC,<br>Nanocrystalline $CoSi_2$ |
| 2 | $Si_{70}Co_{20}C_{10}$ | 3.011 | Co, 1.805 | 0.184 | Amorphous Si<br>Amorphous SiC<br>Nanocrystalline $CoSi_2$ |
| 3 | $Si_{73}Co_{23}C_4$ | 2.968 | Co, 1.962 | 0.070 | Amorphous Si<br>Amorphous SiC<br>Nanocrystalline $CoSi_2$ |
| 4 | $Si_{70}Co_{15}C_{15}$ | 3.244 | Co, 1.495 | 0.297 | Amorphous Si<br>Amorphous SiC<br>Nanocrystalline $CoSi_2$ |
| 5 | $Si_{70}Ni_{20}C_{10}$ | 3.015 | Ni, 1.800 | 0.184 | Amorphous Si<br>Amorphous SiC<br>Nanocrystalline $NiSi_2$ |
| 6 | $Si_{70}Ni_{15}C_{15}$ | 3.248 | Ni, 1.454 | 0.298 | Amorphous Si<br>Amorphous SiC<br>Nanocrystalline $NiSi_2$ |
| 7 | $Si_{70}Fe_{15}C_{15}$ | 3.294 | Fe, 1.404 | 0.302 | Amorphous Si<br>Nanocrystalline $FeSi_2$<br>Amorphous SiC |
| 8 | $Si_{70}Ti_{20}C_{10}$ | 3.230 | Ti, 1.573 | 0.197 | Amorphous Si<br>Amorphous SiC<br>Nanocrystalline $TiSi_2$ |
| 9 | $Si_{70}Mo_{15}C_{15}$ | 2.742 | Mo, 2.007 | 0.251 | Amorphous Si<br>Amorphous SiC<br>Nanocrystalline $MoSi_2$ |
| 10 | $Si_{70}Co_{15}Ni_5C_{10}$ | 3.012 | Co, 1.354<br>Ni, 0.4500 | 0.184 | Amorphous Si,<br>Amorphous $NiSi_2$<br>Amorphous SiC,<br>Nanocrystalline $CoSi_2$ |
| 11 | $Si_{70}Co_{10}Ni_{10}C_{10}$ | 3.013 | Co, 0.903<br>Ni, 0.900 | 0.184 | Amorphous Si<br>Amorphous $NiSi_2$<br>Amorphous SiC<br>Nanocrystalline $CoSi_2$ |
| 12 | $Si_{70}Co_5Ni_{15}C_{10}$ | 3.014 | Co, 0.452<br>Ni, 1.350 | 0.184 | Amorphous Si<br>Amorphous SiC<br>Nanocrystalline $CoSi_2$<br>Nanocrystalline $NiSi_2$ |
| 13 | $Si_{70}Fe_5Ni_{10}C_{15}$ | 3.263 | Fe, 0.464<br>Ni, 0.974 | 0.299 | Amorphous Si<br>Amorphous SiC<br>Amorphous $FeSi_2$<br>Nanocrystalline $NiSi_2$ |
| 14 | $Si_{70}Co_{10}Ni_5C_{15}$ | 3.245 | Co, 0.973<br>Ni, 0.485 | 0.297 | Amorphous Si<br>Amorphous SiC<br>Amorphous $NiSi_2$,<br>Nanocrystalline $CoSi_2$ |
| 15 | $Si_{74}Sn_2Co_{24}$ | 1.672 | Co, 1.138<br>Sn, 0.191 | 0 | Amorphous Si<br>Amorphous Sn<br>Nanocrystalline $CoSi_2$ |
| 16 | $Si_{73}Sn_2Ni_{25}$ | 1.638 | Ni, 1.172<br>Sn, 0.190 | 0 | Amorphous Si<br>Amorphous Sn<br>Nanocrystalline $NiSi_2$ |

TABLE 1B

Alloy powder preparations

| Example No. | Stoichiometric Formula (Atomic Percent) | Observed phases from X-ray data |
|---|---|---|
| 17 | $Si_{70}Fe_{10}Ti_{10}C_{10}$ | Si (grain size ~10-20 nm)<br>$TiSi_2$ (grain size ~10-20 nm)<br>$FeSi_2$ (grain size ~10-20 nm)<br>Amorphous $FeSi_2$ |
| 18 | $Si_{74.66}Fe_{10.67}Ti_{10.67}C_4$ | Si (grain size ~10-20 nm)<br>$TiSi_2$ (grain size ~10-20 nm)<br>$FeSi_2$ (grain size ~10-20 nm)<br>Amorphous $FeSi_2$ |
| 19 | $Si_{70}Fe_{15}Ti_5C_{10}$ | Si (grain size ~10-20 nm)<br>$TiSi_2$ (grain size ~10-20 nm)<br>$FeSi_2$ (grain size ~10-20 nm)<br>Amorphous $FeSi_2$ |
| 20 | $Si_{74.67}Fe_{16}Ti_{5.33}C_4$ | Si (grain size ~10-20 nm)<br>$TiSi_2$ (grain size ~10-20 nm)<br>$FeSi_2$ (grain size ~10-20 nm)<br>Amorphous $FeSi_2$ |

TABLE 2

Electrochemical Cell Examples

| Example No. | Capacity mAh/gram after 40 cycles | Coulombic Efficiency |
|---|---|---|
| 1 | 479 | 0.998 |
| 2 | 718 | 0.994 |
| 3 | 761 | 1.016 |
| 4 | 896 | 0.997 |
| 5 | 961 | 1.000 |
| 6 | 1089 | 0.998 |
| 7 | 758 | 0.998 |
| 8 | 759 | 1.000 |
| 9 | 607 | 0.998 |
| 10 | 778 | 0.997 |
| 11 | 814 | 0.997 |
| 12 | 889 | 0.997 |
| 13 | 903 | 0.992 |
| 14 | 904 | 0.999 |
| 15* | 733 | 0.996 |
| 16* | 897 | 0.987 |
| 17 | 1070 | 0.997 |
| 18 | 1184 | 0.997 |
| 19 | 890 | 0.997 |
| 20 | 960 | 0.996 |

*Examples 15 and 16 were measured after 10 cycles instead of 40.

A number of embodiments of the invention have been described. Nevertheless, it will be understood that various modifications may be made without departing from the spirit and scope of the invention. Accordingly, other embodiments are within the scope of the following claims.

What is claimed is:

1. An electrode composition for a lithium ion battery having the formula $Si_xM_yC_z$ where x, y, and z represent atomic percent values and
   (a) $x > 2y + z$;
   (b) x, y and z are greater than 0; and
   (c) M is one or more metals selected from manganese, molybdenum, niobium, tungsten, tantalum, iron, copper, titanium, vanadium, chromium, nickel, cobalt, zirconium, yttrium, or combinations thereof,
   wherein the Si, M, and C elements are arranged in the form of a multi-phase microstructure comprising:
   (i) an amorphous phase comprising silicon;
   (ii) a nanocrystalline phase comprising metal silicide; and
   (iii) a phase comprising a silicon carbide.

2. An electrode composition according to claim 1 wherein M is one or more metals selected from cobalt, nickel, iron, titanium, molybdenum, tungsten, or combinations thereof.

3. An electrode composition according to claim 1 wherein $x \geq 60$.

4. An electrode composition according to claim 1 wherein $z \geq 10$.

5. An electrode composition according to claim 1 wherein $z \geq 15$.

6. An electrode composition according to claim 1 wherein $x \geq 60$ and M is one or more metals selected from cobalt, nickel, iron, titanium, molybdenum, or combinations thereof.

7. An electrode composition according to claim 6 wherein $z \geq 10$.

8. An electrode composition according to claim 1 wherein M comprises Co.

9. An electrode composition according to claim 8 wherein $x \geq 60$.

10. A lithium ion battery comprising:
    an anode;
    a cathode; and
    an electrolyte,
    wherein the anode comprises a composition having the formula $Si_xM_yC_z$ where x, y, and z represent atomic percent values and
    (a) $x > 2y + z$;
    (b) x, y, and z are greater than 0; and
    (c) M is one or more metals selected from manganese, molybdenum, niobium, tungsten, tantalum, iron, copper, titanium, vanadium, chromium, nickel, cobalt, zirconium, yttrium, or combinations thereof,
    wherein the Si, M, and C elements are arranged in the form of a multi-phase microstructure comprising:
    (i) an amorphous phase comprising silicon;
    (ii) a nanocrystalline phase comprising metal silicide; and
    (iii) a phase comprising a silicon carbide.

11. A lithium ion battery according to claim 10 wherein M is one or more metals selected from cobalt, nickel, iron, titanium, molybdenum, tungsten, or combinations thereof.

12. A lithium ion battery according to claim 10 wherein $x \geq 60$.

13. A lithium ion battery according to claim 10 wherein $z \geq 10$.

14. A lithium ion battery according to claim 10 wherein $z \geq 15$.

15. A lithium ion battery according to claim 10 wherein $x \geq 60$ and M is one or more metals selected from cobalt, nickel, iron, titanium, molybdenum, or combinations thereof.

16. A lithium ion battery according to claim 15 wherein $z \geq 10$.

17. A lithium ion battery according to claim 10 wherein M comprises Co.

18. A lithium ion battery according to claim 17 wherein $x \geq 60$.

19. A lithium ion battery according to claim 10 wherein the anode further comprises a binder and a conductive diluent.

20. A lithium ion battery according to claim 19 wherein the binder comprises a polyimide.

21. A lithium ion battery according to claim 19 wherein the conductive diluent comprises carbon black.

22. A lithium ion battery according to claim 10 wherein the electrolyte comprises fluoroethylene carbonate.

* * * * *